United States Patent [19]

Cutcher

[11] Patent Number: 4,630,636
[45] Date of Patent: Dec. 23, 1986

[54] ACTUATOR WITH NONELASTOMERIC SEAL

[75] Inventor: Dennis R. Cutcher, Gretna, La.

[73] Assignee: Baker CAC, Belle Chasse, La.

[21] Appl. No.: 552,248

[22] Filed: Nov. 16, 1983

[51] Int. Cl.⁴ .................... F16K 43/00; F16K 41/00
[52] U.S. Cl. ........................... 137/315; 251/214;
    277/124; 277/125; 277/164; 277/205
[58] Field of Search ............ 251/214; 137/315;
    277/123, 124, 125, 164, 205

[56] References Cited

U.S. PATENT DOCUMENTS

| | | | |
|---|---|---|---|
| 2,322,679 | 6/1943 | Williamson | 277/124 |
| 2,456,081 | 12/1948 | Penich | 277/124 |
| 2,610,846 | 9/1952 | Hanna | 277/124 |
| 2,684,274 | 7/1954 | Saxon | 277/124 |
| 3,096,070 | 7/1963 | Wolfensperger | 251/214 |
| 3,342,500 | 9/1967 | Knudson | 277/125 |
| 3,419,280 | 12/1968 | Wheeler | 277/124 |
| 3,653,670 | 4/1972 | Sifri et al. | 277/164 |
| 3,901,517 | 8/1975 | Heathcott | 277/205 |
| 3,907,307 | 9/1975 | Maurer | 277/124 |
| 4,133,542 | 1/1979 | Janian et al. | 277/164 |
| 4,304,409 | 12/1981 | Orlowski | 277/205 |
| 4,473,231 | 9/1984 | Tilton | 277/124 |

FOREIGN PATENT DOCUMENTS 0102496  8/1979  Japan ............................ 277/125

Primary Examiner—George L. Walton
Attorney, Agent, or Firm—Norvell & Associates

[57] ABSTRACT

A seal assembly containing a plurality of nonelastomeric sealing elements for use in a valve actuator is disclosed. The valve actuator can be incorporated into a fluid transmission conduit at the surface of a producing oil or gas well. A spring member radially biases one sealing element into engagement with concentric tubular members. Additional sealing elements are radially expandable when subjected to axial compression to close any gap along the surfaces of the concentric tubular members to provide extrusion resistance, greater sealing performance, and fire resistant capability. The seals can be used under hostile conditions, such as extreme temperature and in the presence of corrosive fluids and corrosion inhibitors.

3 Claims, 3 Drawing Figures

ACTUATOR WITH NONELASTOMERIC SEAL

BACKGROUND OF THE INVENTION

1. Field of the Invention

This invention relates to sealing elements used between reciprocal tubular elements and, more particularly, to nonelastomeric seal cartridges used with valve actuators responsive to control fluid pressure in oil and gas well operations.

2. Description of the Prior Art

Dynamic seal systems have been conventionally employed between reciprocal tubular members in a variety of applications in oil and gas well operations. Typically, packing or sealing elements disposed between two tubular members or conduits comprise O-ring seals, T-seals, and multi-element chevron seal stacks. For oil and gas wells in which fluids are produced at surface and subsurface temperatures on the order of 250° F. and in which corrosion is not significant, conventional elastomeric seals may be used to satisfactorily maintain sealing integrity between the reciprocal tubular members. These elastomers, such as nitrile, are deformable under low stress and when the stress is released will return to their original configuration under the temperatures and pressures previously encountered in producing oil and gas wells. However, these materials will lose their resiliency and are incapable of maintaining adequate sealing integrity under the more hostile environments. Conventional elastomeric seals lose their inherent resiliency and their ability to establish sealing integrity between adjacent tubular members. For example, at temperatures in the order of 450°, conventional elastomers cannot be used for sealing applications in oil and gas wells.

In addition to the effects of temperature in diminishing the performance of conventional elastomers, corrosion inhibitors used with the sour, highly corrosive fluids may react with conventional elastomers rendering the conventional elastomers completely unsuitable. For example, amine inhibitors used to overcome the damaging effects of hydrogen sulfide contained in sour fluid wells can render many conventional elastomers completely useless for sealing and packing applications.

The performance of conventional elastomers at elevated temperatures is also detrimentally effected by gas impregnation of the elastomeric sealing elements. These conventional elastomers are not impervious to gas, and during operation in oil and gas well environments, gases tend to impregnate and indeed pass directly through the sealing elements. The gases impregnating the elastomeric sealing elements expand when heated. The heated gases apply stresses to the elastomer and tend to damage the elastomeric elements when heated. Indeed, when these seals are removed from the concentric tubular members confining the seals, the impregnated gases may completely rupture and destroy the sealing element. This phenomenon is known is an explosive decompression of the seals.

Sealing elements fabricated using nonelastomer materials, such as polytetrafluoroethylene, commonly identified by the Dupont trademark Teflon, and polyphenolene sulfide, commonly referred to by the Phillips trademark Ryton, have been used in seal systems in oil and in gas applications. Nonelastomeric elements fabricated from these materials have been used in multi-component seal stacks as backups for new elastomers capable of operating under hostile conditions and in the presence of damaging fluids. These elastomers are, however, quite expensive. The use of completely nonelastomeric seal systems is therefore highly desirable.

Nonelastomeric seal systems cannot rely upon any inherent resiliency to energize the seal to maintain sealing integrity between adjacent surfaces. One means of imparting energy to a nonelastomeric seal stack is to employ an axially compressible spring member which continuously applies axial compression to the seal stacks to urge nonelastomeric seal elements into a radially expanded configuration. For example, an axially compressive spring can be used in conjunction with a plurality of chevron-shaped sealing elements to urge convex surfaces of the chevron-shaped sealing elements outwardly to maintain sealing integrity with concentric tubular members. Such axially compressive springs can also be used to maintain a force on nonelastomeric members, such as polytetrafluoroethylene, with a tendency to flow or plastically deform under pressure. An accumulative axially compressive spring will continue to apply compressive loads after plastic deformation of such members. Axially compressive springs are not, however, completely satisfactory, and other means of maintaining a seal using nonelastomeric sealing elements are needed for a satisfactory seal system. For example, axially compressive springs can be difficult to package in a multi-component seal system.

Seal stacks having better performance under hostile conditions than can be obtained with conventional elastomers are especially needed for valve actuators used in well safety systems and as components in natural gas transmission lines. Conventional actuators are utilized to manipulate a valve mechanism within a flow line into open and/or closed position in response to control pressure variation. Normally, these actuators comprise a shaft and a fluid activated mechanism in association with the shaft which, upon an increase in control fluid pressure causes longitudinal movement of the tubular shaft to shift a valve member in relation to the valve seat. Then the control line pressure produces the pressure force acting on the tubular shaft, thus permitting the valve to return to its unactuated position. Flapper or ball valves are frequently utilized in safety systems used in conjunction with the drilling, completion and production of offshore, as well as onshore, oil and gas wells. Additionally, actuating components can be utilized in natural gas transmission lines and in similar applications.

SUMMARY OF THE INVENTION

A seal system for use between concentric tubular members consists of a plurality of elements having a generally nonelastomeric character. The seal elements can be fabricated from a nonelastomeric material or can be fabricated from a generally elastomeric material which does not exhibit elastomeric characteristics under extreme environmental conditions. The primary sealing element comprises a member engagable with a radially acting spring. The radially acting spring urges the primary sealing member into contact with both the inner and outer concentric tubular members to establish sealing integrity therealong. Additional elements, which in the preferred embodiment of this invention have a generally chevron shape, are positioned adjacent the primary sealing element. The additional sealing elements are radially expandable when subjected to an axially compressive force. Since the primary sealing element engages both the inner and outer tubular members, a pressure differential is maintained across the primary sealing element. Thus the pressure differential acting on the primary sealing element is transmitted to the additional sealing elements to apply a compressive load. The additional sealing elements thus expand to engage both the inner and outer tubular members to close any gaps along the surfaces of the inner and outer tubular members and to provide additional sealing integrity. A metallic member engages the additional sealing elements and is urged radially to establish a backup metal-to-metal seal with both the inner and outer tubular member when subjected to axial compression. This energized metal-to-metal seal renders to seal fire retardant even under conditions in which the nonelastomeric sealing elements may have melted under the extreme heat of a fire.

DETAILED DESCRIPTION OF THE PREFERRED EMBODIMENTS

Figures 1, 2:
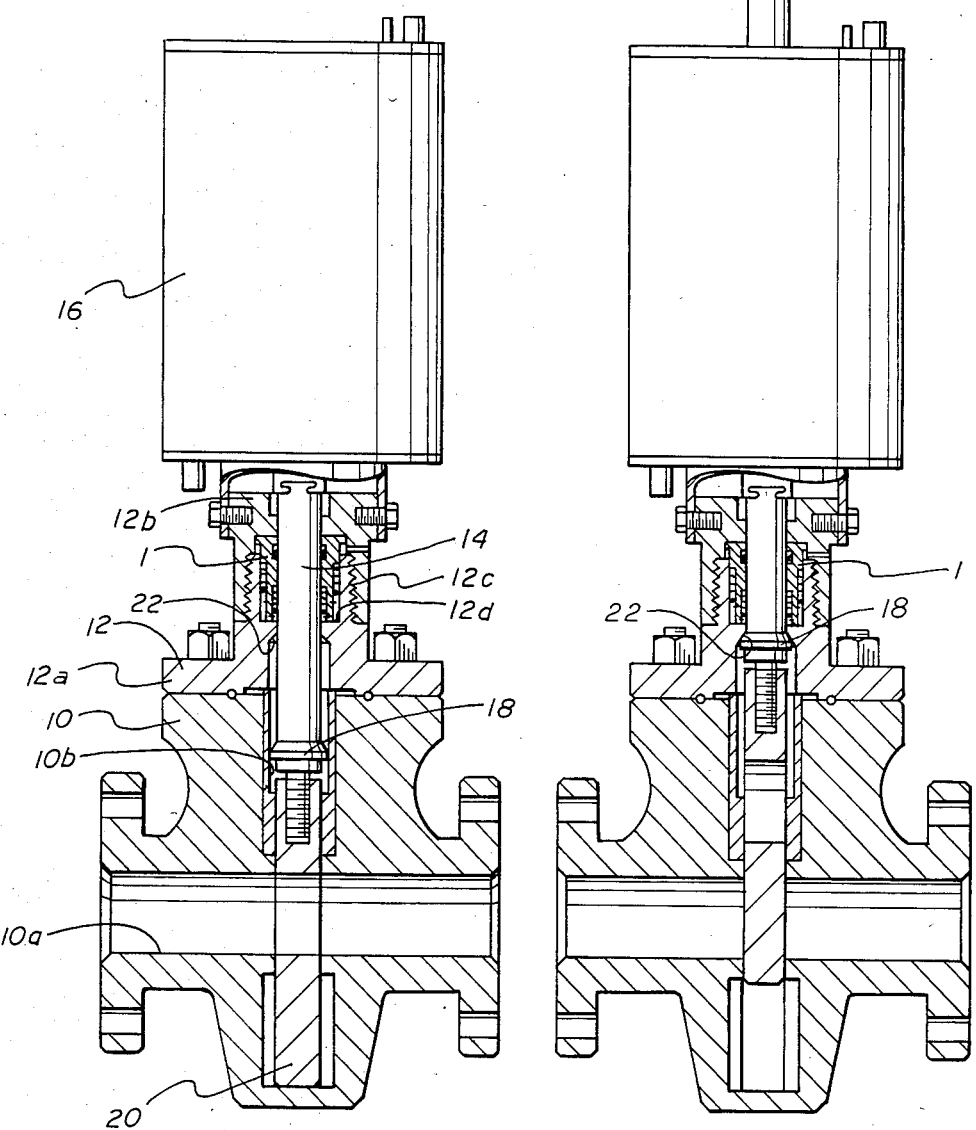
FIG. 1 is a view of a typical valve actuator used to operate a gate valve which may form a part of a well head lubricator assembly, and which employs a seal cartridge containing nonelastomeric sealing elements between a reciprocal shaft and a stationary housing.
FIG. 2 shows the valve actuator of FIG. 1 in the closed position.

FIGS. 1 and 2 show a typical valve actuator employing a nonelastomeric seal system incorporated in a universal replaceable cartridge. FIG. 1 shows the actuator with the valve in the open position, while FIG. 2 shows the actuator with the valve in the closed position. It is apparent that the nonelastomeric sealing cartridge 1 must maintain sealing integrity during reciprocation of the inner tubular member 14 relative to the outer tubular housing 12.

FIG. 1 depicts a gate valve base 10 having a transversely extending flow bore 10a. Valve base 10 can be incorporated into a fluid transmission conduit with bore 10a being aligned with the flow bore in the fluid transmission conduit. For example, the valve base 10 may be incorporated in a lubricator in the Christmas tree at the surface of a producing oil or gas well.

Gate valve base 10 receives a gate valve element 20 which is reciprocal transversely relative to flow bore 10a from the open position in FIG. 1 to the closed position in FIG. 2. Gate valve element 20 is in turn attached by means of a conventional threaded connection to a tubular valve stem 14. An enlarged frusto-conical valve stem head 18 is located on valve stem 14 and is reciprocal on the valve stem between an open position shown in FIG. 1 and a position shown in FIG. 2 in which the stem valve head 18 engages a cooperating seat 22.

A tubular housing or bonnet 12 is attached to valve base 10 and has an internal bore for receiving the reciprocal valve stem 14. Bonnet 12 has two interconnected sections 12a and 12b. Bonnet section 12a is attached to the valve base 10 in a conventional manner. Bonnet section 12b is also attached to the actuator 16, again in a conventional manner. The intermediate threads 12c interconnecting bonnet sections 12a and 12b are located radially adjacent an inner annular recess 12d providing a clearance between the bonnet 12 and the reciprocal valve stem 14. A removable and replaceable seal cartridge 1 is positioned within the recess 12d to establish sealing integrity between the bonnet 12 and the reciprocal valve stem 14.

The actuator 16, shown in FIGS. 1 and 2, is of conventional construction and is adapted to impart transverse reciprocal movement to the valve stem 14 to shift gate valve member 20 to open and close the flow path through bore 10a. Actuator 16 may comprise an actuator for shifting the valve stem 14 in response to changes in control fluid pressure acting through the actuator on the valve stem 14. It should be understood that any conventional actuator could be employed in conjunction with the invention as disclosed herein. The precise construction of the actuator does not comprise an essential element of this invention.

Figure 3:
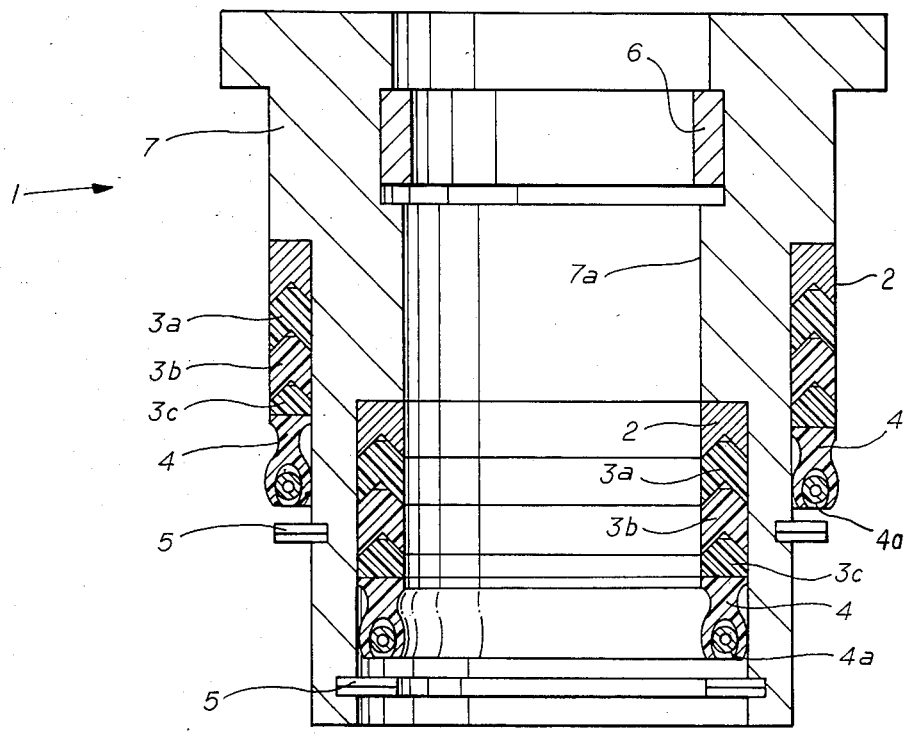
FIG. 3 is a view of a replaceable seal cartridge used in the valve actuators of FIGS. 1 and 2.

An individual seal cartridge 1, such as that positioned within recess 12d and the bonnet 12, is shown in FIG. 3. This seal cartridge 1 can be inserted and removed from recess 12d for replacement when necessary. Seal cartridge 1 comprises an annular metallic housing 7 having an annular nonelastomeric seal stack extending around its exterior surface and a second similar nonelastomeric seal stack positioned within a recess on the interior of housing 7. It should be apparent from FIGS. 1 and 2 that the exterior seal stack establishes a static seal with the interior surface of the bonnet 12 within recess 12b. The interior seal stack on seal cartridge 1 establishes a dynamic seal with the movable valve stem 14 reciprocal through the inner bore of the seal cartidge 1. As seen in FIG. 3, each multi-component seal stack is received between a shoulder on the metallic housing and a retainer, such as a snap-ring 5 attached to the housing 7. In the preferred embodiment of this invention, the snap-rings 5 are received within companion grooves on the exterior and interior surface of the housing at a point spaced from the shoulder. Snap-rings 5 can be positioned on the housing after the multi-component seal stacks have been inserted as shown. It should be understood that other conventional means could be substituted for snap-ring 5. For example, a shoulder permitting movement of the seal stack components in one direction only might be employed.

In the preferred embodiment of this invention, each nonelastomeric seal stack comprises five separate elements. The first nonelastomeric sealing element located adjacent either snap-ring 5 comprises an element 4 having a cup shaped cavity for receiving a spring member 4a having an annular cross-section. In the preferred embodiment of this invention, the resilient spring member 4a is formed of a temperature and corrosion resistant metallic alloy, such as Hastalloy, Elgiloy or Inconel. The first sealing element 4 comprises a nonelastomeric polymeric material, such as polytetrafluoroethylene (Teflon). Suitable carbon, graphite or glass fillers may be added to the pure polytetrafluoroethylene material to stabilize the material to minimize cold flow and other problems exhibited by such material. As seen in FIG. 3, the spring 4a biases the outer lip of the elastomeric seal 4 radially beyond the remaining elements of each seal stack.

Each seal stack has three additional nonelastomeric elements 3a, 3b and 3c. These nonelastomeric elements have interfitting concave and convex surfaces. Each seal stack may employ a metallic element 2 on the opposite end of the individual seal stack from the first nonelastomeric sealing member 4. Metallic element 2 has a concave surface on its interior end adjacent the nonelastomeric backup element 3a. In the preferred embodiment of this invention, element 3a is chevron-shaped and is formed from a material, such as polyphenolene sulfide. Element 3a has a resistance to extrusion greater than that exhibited by the first polytetrafluoroethylene nonelastomeric seal element 4. The convex surface on nonelastomeric element 3a interfits with the concave surface on metal seal ring 2. The angle of divergence for the convex surface on element 3a may be slightly greater than the angle of divergence between the surfaces defining the concave end of metal element 2. As the chevron-shaped element 3a is urged axially toward the concave surface of metal element 2, the ends defining the concave surface of element 2 will tend to diverge thus urging that portion of the metal element 2 into closer fitting relationship relative to the adjacent tubular member. Greater sealing integrity will thus be established along either the static surface of bonnet 12 or along the dynamic surface of valve stem 14. In the preferred embodiment of the invention, a nonelastomeric sealing element 3b formed from polytetrafluoroethylene, again with suitable fillers, is positioned adjacent the convex surface of seal element 3a. Seal element 3b has a chevron-shaped cross-section and the convex surface of element 3b interfits with the concave surface of element 3a in much the same fashion that element 3a interfits with the concave surface of element 2. An additional element 3c has a convex surface engaging the concave surface of element 3b and a mating face engagable with one end of the first sealing element 4. Element 3c can be fabricated from a material, such as polyphenolene sulfide. Elements 3a, 3b and 3c comprise nonelastomeric sealing and backup members adapted to improve the sealing performance during normal operation of the seal stack.

In operation, the seal cartridge 1 can be inserted over the valve stem 14 during assembly of the bonnet. Seal cartridge 1 is received within recess 12d and the wear bearing on the interior of the housing 7 engages the exterior of the valve stem to prevent metal-to-metal contact between the valve stem 14 and the seal housing 7. In the preferred embodiment of the invention, the inner bore 7a of housing 7 will be spaced from the valve stem 14 by an amount sufficient to prevent metal-to-metal contact with the attendant frictional forces encountered with valve stem 14. When the seal cartridge 1 is inserted within recess 12d and over valve stem 14, the protruding portion of seal element 4 is radially urged against the bias of spring 4a. Spring 4a does, however, maintain a radial force upon the opposed surfaces defining the spring retaining cavity of seal element 4 to urge the seal element into contact with the adjacent tubular member. Since seal element 4 establishes sealing integrity, the pressure forces acting on one end of seal element 4 will most likely be different from the pressures acting on the other surface. In general, the pressure acting on the end of the seal stack to which seal element 4 is most closely adjacent will be greater than the forces acting on the opposite end. The pressure differential acting on element 4 will tend to axially compress the remaining elements 3a, 3b and 3c of the nonelastomeric seal stack. Because of the configuration of elements 3a, 3b and 3c and of the metallic ring 2, the additional axial compressive load transmitted through primary sealing element 4 will urge elements 3a, 3b and 3c and ring 2 into closer fitting relationship with the adjacent surface of a tubular member. Thus any extrusion gap through which the polytetrafluoroethylene material comprising seal element 4 might tend to flow will be closed, preventing a loss of material and therefore a resultant loss in sealing integrity of element 4. The closer fitting relationship of the interfitting elements 3a, 3b and 3c will also act as an additional seal along the adjacent tubular surface. This additional seal will be capable of holding additional pressure differential and the overall pressure holding capability of the stack can be increased. The radially urged surfaces of ring member 2 will also tend to establish a metal-to-metal seal along a portion of the adjacent tubular surface. Since the axial length of metal element 2 is much less than the axial length of the seal cartridge itself, the frictional forces created by such a metal-to-metal seal will be greatly reduced.

In addition to maintaining sealing integrity over a wide range of normal operating temperatures, the seal assembly disclosed herein will also be useful in preventing any leakage in the event of a fire. The temperatures encountered in a fire would generally be sufficient to either melt the nonelastomeric sealing elements or to render the elements incapable of withstanding pressures exerted on them. Even so, the pressures applied to the nonelastomeric sealing elements in the event of a fire would be transferred as a pressure load to the concave surface of seal ring 2. The seal ring would be urged radially into contact with the adjacent tubular surface preventing any significant loss in sealing material or the escape of any gases or flame.

The nonelastomeric seal stack comprising the preferred embodiment of this invention overcomes the problems encountered with conventional elastomeric seal stacks at high temperatures and can be used at the temperatures normally encountered in more conventional wells. The seal stack and seal cartridge disclosed herein is therefore universal and can replace more conventional elastomeric sealing assemblies in addition to its use under hostile conditions at which elastomeric seal assemblies do not perform satisfactorily. The seal cartridge shown in FIG. 3 can also be dimensioned to replace seal cartridges now containing elastomeric sealing elements. The new nonelastomeric seal cartridges can therefore be used in existing valve actuator assemblies.

Although the invention has been described in terms of the specified embodiment which is set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A non-elastomeric self-energizing annular seal system for use in establishing sealing integrity between concentric tubular members defining a passage exposed to high fluid pressures, comprising:
   a first deformable non-elastomeric seal element mounted between said tubular members adjacent the high pressure end of the seal system;
   a radially expandable, metallic spring member radially biasing only said first non-elastomeric seal element into radial sealing contact with the concentric tubular members without applying an axially biasing force to the seal system, but permitting axial movement of said first non-elastomeric seal element by said high fluid pressure; additional deformable non-elastomeric annular seal elements axially contiguous to each other and to the first non-elastomeric seal element, said additional seal elements being freely insertable between said tubular members; a metallic element at the low pressure end of the seal system limiting axial movement of said non-elastomeric seal elements; and interfitting convex and concave surfaces on the additional non-elastomeric seal elements and the metallic element, oriented with the elements more closely adjacent the high pressure end urging adjacent elements radially in contact with said concentric tubular elements when subjected to loading by axial movement of said first non-elastomeric seal element produced by said high fluid pressure.

2. The seal system of claim 1 wherein said first non-elastomeric deformable annular sealing element is primarily formed of polytetrafluoroethylene.

3. The seal system of claim 2 wherein said additional non-elastomeric deformable annular seal elements are formed of a material having a greater resistance to extrusion than polytetrafluoroethylene.

* * * * *